United States Patent

Kamijo et al.

[11] Patent Number: 6,152,983
[45] Date of Patent: Nov. 28, 2000

[54] METHOD OF PRODUCING REDUCED IRON PELLETS

[75] Inventors: Tsunao Kamijo; Kazuya Miyagawa; Yoshimichi Takenaka; Masakata Shimizu; Shoji Shirouchi; Haruhisa Iwakiri, all of Kakogawa, Japan

[73] Assignee: Kabushiki Kaisha Kobe Seiko Sho, Kobe, Japan

[21] Appl. No.: 09/213,249

[22] Filed: Dec. 17, 1998

[30] Foreign Application Priority Data

Dec. 18, 1997 [JP] Japan ................................. 9-349473

[51] Int. Cl.[7] ........................... C21B 13/08; C21B 13/12; C22B 19/00
[52] U.S. Cl. ................... 75/484; 75/504; 75/656; 75/961; 75/10.31
[58] Field of Search ............... 75/961, 656, 484, 75/504, 10.31

[56] References Cited

U.S. PATENT DOCUMENTS

| | | |
|---|---|---|
| 3,770,416 | 11/1973 | Goksel . |
| 3,836,353 | 9/1974 | Holley . |
| 5,186,741 | 2/1993 | Kotraba et al. . |
| 5,865,875 | 2/1999 | Rinker et al. ............................ 75/656 |

FOREIGN PATENT DOCUMENTS

| | | |
|---|---|---|
| 0 387 479 | 9/1990 | European Pat. Off. . |
| 0 508 166 | 10/1992 | European Pat. Off. . |
| 9-157766 | 6/1997 | Japan . |

OTHER PUBLICATIONS

Patent Abstracts of Japan, vol. 095, No. 002, Mar. 31, 1995, JP 06 330198, Nov. 29, 1994.

Patent Abstracts of Japan, vol. 097, No. 012, Dec. 25, 1997, JP 09 209047, Aug. 12, 1997.

Derwent Abstract, AN 40157W/24, JP 50–02276, Mar. 11, 1975.

Derwent Abstract, AN 44697W/27, DT 2 456 893, 1975.

*Primary Examiner*—Melvyn Andrews
*Attorney, Agent, or Firm*—Oblon, Spivak, McClelland, Maier & Neustadt, P.C.

[57] ABSTRACT

A carbonaceous material is controlled such that the amount of carbon is from 7 to 60 mass % based on the total amount of iron and Zn in a starting mixture comprising one or more of ducts containing iron oxide and Zn oxide and a binder in an amount to bond the dusts, and water is added to prepare green pellets incorporated with the carbonaceous material. Then, dry pellets prepared by drying the thus prepared green pellets into a reduction furnace, the dry pellets are heated by heat transfer, mainly, radiation such that a temperature elevation rate is from 3 to 13° C./sec within a temperature range from 150 to 900° C. of the pellets, thereby reducing Zn oxide and evaporating Zn, as well as reducing iron oxide to produce reduced iron pellets.

10 Claims, 9 Drawing Sheets

F I G. 1

| STARTING MATERIAL | COMPOSITION (mass%) | | | | | | GRAIN SIZE (μm) |
|---|---|---|---|---|---|---|---|
| | T.Fe | Fe$_2$O$_3$ | FeO | C | O | Zn | Oil | |
| BLAST FURNACE DUST | 35 | 50 | 5 | 33 | 17.6 | 3 | 0 | 44 |
| ROLLING SLUDGE | 70 | - | 50 | - | 11.0 | - | 4 | 5 |

F I G. 2

| TEST MATERIAL | BLENDING | | | | | BLEND COMPOSITION RATIO (mass%) | | | REMARK |
|---|---|---|---|---|---|---|---|---|---|
| | BLENDING RATIO (mass%) | | T.C/T(Fe+Zn) (mass%) | Zn AMOUNT (mass%) | Oil (mass%) | C | O | C/O | |
| | BLAST FURNACE DUST | ROLLING SLUDGE | | | | | | | |
| 1 | 100 | 0 | 86.8 | 3.0 | 0.0 | 33.0 | 17.6 | 188 | COMPARATIVE EXAMPLE |
| 2 | 75 | 25 | 53.8 | 2.25 | 1.0 | 24.8 | 16.0 | 156 | EXAMPLE |
| 3 | 50 | 50 | 30.6 | 1.5 | 2.0 | 16.5 | 14.3 | 115 | EXAMPLE |
| 4 | 35 | 65 | 19.6 | 1.05 | 2.6 | 11.6 | 13.3 | 87 | EXAMPLE |
| 5 | 25 | 75 | 13.3 | 0.75 | 3.0 | 8.3 | 12.7 | 65 | EXAMPLE |

FIG. 3

| TEST MATERIAL | REDUCTION RATIO (mass%) | REDUCED PELLET ||||| NOTE |
|---|---|---|---|---|---|---|---|
| | | Zn REMOVING RATIO (mass%) | Zn AMOUNT (mass%) | SHAPE RETAINABILITY (%) | AMOUNT OF C (mass%) | CRUSH STRENGTH (kgf/P) | |
| 1 | 95.0 | 98.7 | 0.039 | 0 | 21.5 | 0 | COMPARATIVE EXAMPLE |
| 2 | 99.0 | 99.1 | 0.020 | 60 | 13.1 | 45 | EXAMPLE |
| 3 | 99.1 | 99.5 | 0.008 | 98 | 6.6 | 80 | EXAMPLE |
| 4 | 93.0 | 99.3 | 0.007 | 98 | 0.5 | 80 | EXAMPLE |
| 5 | 75.0 | 98.7 | 0.010 | 95 | 0.1 | 75 | EXAMPLE |

METHOD OF PRODUCING REDUCED IRON PELLETS

BACKGROUND OF THE INVENTION

1. Field of the Invention

The present invention concerns a method of producing reduced iron pellets formed by reducing iron oxide pellets containing Zn ingredients. More in particular, the invention relates to a method of producing reduced iron pellets formed by reducing iron oxide pellets containing dusts (including sludges) containing Zn ingredients formed in iron works.

2. Description of the Related Art

In iron and steel making processes including blast furnaces, converters and electric furnaces, various kinds of iron oxide-containing dusts or sludges are formed in a great amount which are recovered and reused as iron sources (used in the form of pellets or sintered ores). However, iron oxide-containing dusts or sludges resulting from iron and steel making processes may contain noxious Zn ingredients such as Zn oxide, to result in a problem that iron sources of high Zn amount can not be used as the starting material (hereinafter, used as the meaning of feed material) for blast furnaces. In the blast furnace, if the starting material contains a great amount of Zn, the operability of the blast furnace is worsened, as well as it leads to a problem that Zn attacks refractories of furnace walls.

As described above, use of dusts or sludges containing Zn-containing iron oxide has been restricted and, particularly, iron oxide-containing dusts or sludges containing Zn ingredients formed in a great amount from blast furnaces have not been effectively recovered and reused as iron sources at present.

In view of the above, methods of producing reduced iron by removing Zn from pellets which are molded from iron oxide-containing dusts or sludges resulting from iron and steel making processes have been proposed in recent years. There can be mentioned, for example, a method of using a rotary kiln furnace (refer to Japanese Patent Examined Publications Sho 51-13083 and 55-21810) and a method of using a rotary hearth furnace (refer to Japanese Patent Unexamined Application Hei 5-125454 filed in Japan corresponding to U.S. Pat. No. 5,186,741).

The method of using a rotary kiln has a merit in that Zn can be decreased to as low as 0.01 mass % and metallization ratio can be improved to about 80% (about 87% as a reducing ratio). However, since pellets are tumbled and baked in a rotary kiln this method, results in a problem that pellets are powderized during operation, which are melted and deposited to form kiln rings, thereby making the operation impossible. Furthermore, since the total amount of Zn in the starting material fed to the blast furnace is controlled (for example, 0.2 kg Zn/t-pig iron), and the amount of using reduced pellets containing Zn is restricted, the amount of Zn has to be further decreased for use as the starting material for the blast furnace also in this method.

Than, in a method of using a rotary hearth furnace described in Japanese Patent Unexamined Application Hei 5-125454, reduced pellets are produced by forming green pellets comprising a mixture of dusts from steel works, carbonaceous material such as coal or coke and an organic binder, feeding the green pellets on a layer of pellets baked in a rotary hearth furnace, drying them at a temperature lower than 900° C. for 10 to 15 min, thereby forming coked dried pellets and then reducing the pellets at a temperature lower than 1150° C. for 20 to 30 min. While Japanese Patent Unexamined Application Hei 5-125454 describes for the reduced pellets that iron oxide is reduced to a metallic state and Zn ingredient is removed from the reduced pellets, it does not teach about the actual extent of reduction ratio and the amount of Zn. Furthermore, the method does not define the contents of iron and Zn in the pellets and the amount of carbonaceous material to be added. As can be seen from the description that the reduced pellets, when discharged from a rotary hearth furnace at about 1000° C., may possibly include a considerable amount of carbon (as high as 12 mass %) when they are discharged from the rotary hearth furnace), it is suggested that a great amount of carbon (as much as 12% by weight) may remain after the reduction in this method. Residue of a great amount of carbon brings about a problem that not only the content of iron in the reduced pellets is decreased to lower the utilizing efficiency as an iron source, but also the strength of the reduced pellets per se is deteriorated. Particularly, when coal is added as the carbonaceous material, it tends to greatly deteriorate the strength of the reduced pellets per se. If the strength of the pellets is lower, it results in a problem that the reduced pellets are pulverized or crushed in the blast furnace, to lower the air ventilation in the blast furnace and worsen the blast furnace operation, so that the pellets can not be used as the starting material for the blast furnace.

SUMMARY OF THE INVENTION

An object of the present invention is to provide reduction pellets with less Zn content as noxious ingredients, having appropriate grain size and strength and with high reduction ratio as the starting material for the blast furnace, by using iron oxide-containing dusts (including sludges) formed from iron works, particularly, those blast furnace dusts (which contain carbonaceous material but can not be used as the starting material for the blast furnace because of Zn ingredients contained and finely particulate form thereof) and other dust containing Zn ingredients, as well as a method of producing them.

In the method of producing reduced pellets according to a preferred embodiment of the present invention, reduced iron pellets are produced by controlling a carbonaceous material such that the amount of carbon is from 7 to 60 mass % based on the total amount of iron and Zn in a starting material mixture containing one or more of dusts containing iron oxide and Zn oxide and a sufficient amount of a binder to bond the dusts and then adding water to prepare them into green pellets incorporated with the carbonaceous material. Then, reduced iron pellets are produced by drying the thus prepared green pellets into a reduction furnace, heating the dry pellets by heat conduction, mainly, irradiation such that a temperature elevation rate is from 3 to 13° C./sec within a temperature range of the pellets from 150 to 900° C., reducing Zn oxide and evaporating Zn and reducing iron oxide.

In this case, the temperature elevation rate of the pellets is increased and the amount of carbon charged in the pellets is optimized. Accordingly, the shape of the pellets upon reduction can be retained and, as a result, the reduction ratio of the reduced pellets can be improved and pulverization of the pellets can be prevented during reduction.

Further, it is preferred to reduce iron oxides and Zn oxides at 1100 to 1350° C.

In this case, since the Zn oxide is reduced preferentially to the reduction of the iron oxide at a temperature higher than 1100° C., the amount of Zn in the pellets can be decreased remarkably. Further, since the reduction ratio is improved and the sintering of metallic iron is proceeded, the strength of the reduced pellets can be increased.

Further, as the dusts, carbonaceous material-containing blast furnace dusts, converter dusts, sintering dusts, electric furnace dusts or a mixture thereof can be used. Use of the dusts can decrease the amount of industrial wastes.

It is preferred to use a carbonaceous material comprising a coke ingredient.

In this case, since the coke has no substantial volatile ingredients, volatile ingredients are not evaporated in the above-mentioned temperature range causing less reduction of pellets and sintering (150–900° C.). As a result, since the elevation of the gas pressure along with the evaporation of the volatile ingredients is not caused and the pellets are not pulverized, temperature elevation rate of the pellets can be increased. Particularly, when blast furnace dusts containing the coke ingredients as the carbonaceous material are used, use of additional carbonaceous material such as coal or coke is no more required, so that energy and resource saving can be attained.

It is preferred to use a rotary hearth furnace hearth as the sintering furnace.

In this case, by the use of the rotary hearth furnace, reduced pellets can be produced in a great amount and at a high efficiency.

DESCRIPTION OF THE PREFERRED EMBODIMENTS

Explanation is to be made to a preferred embodiment for the method of producing reduced pellets in a preferred embodiment according to the present invention. At first, a carbonaceous material is controlled such that the amount of carbon is from 7 to 60 mass % based on the total amount of iron and Zn in a starting mixture comprising one or more of dusts containing iron oxide and Zn oxide and a binder in an amount sufficient to bond the dusts, and water is added to prepare them into carbonaceous material-incorporated green pellets. Then, the thus prepared green pellets are dried, the dry pellets are charged in a reduction furnace, and the dry pellets are heated by heat transfer mainly radiation such that the temperature elevation rate is from 3 to 13° C./sec within a temperature range of the pellets from 150 to 900° C., thereby reducing Zn oxide and evaporating Zn, as well as reducing iron oxide to prepare reduced iron pellets.

It is necessary that the amount of carbon of the carbonaceous material in the pellets is from 7 to 60 mass % based on the total amount of iron and Zn in the pellets. If it is less than 7 mass %, the amount of carbon required for the reduction of the iron oxide and Zn oxide in the pellets is insufficient to lower the reduction ratio of the iron oxide and make reduction of Zn oxide insufficient thereby lowering the Zn removing ratio and also lowering the pellet strength. On the other hand, if the amount of carbon exceeds 60 mass %, the pellet shape can no more be retained during reduction to lower the reduction efficiency.

Further, it is more preferred that the amount of carbon of the carbonaceous material in the pellets is from 13 to 60 mass % based on the total amount of iron and Zn in the pellets. This is because the metallizing ratio can be further improved at 13 mass % or higher. From 13 to 45 mass % is further preferred. If the carbon amount is 45 mass % or less, the pellet reduction ratio can be increased and the pellet shape can be retained more firmly. 13 to 20 mass % is further preferred. If the carbon amount is less than 20 mass %, the blending amount of the carbonaceous material can be decreased to save the amount of the carbonaceous material, as well as the iron productivity is improved due to the increase in the iron component.

The effect of the amount of carbon incorporated into the pellets will be explained further. The pellet reduction ratio is determined depending on the ratio between the amount of carbon and the amount of iron (amount of iron oxide). Namely, iron components in the dusts or sludges as the starting material for the pellets are usually present in the form of iron oxide. In the reduction of the iron oxide, the iron oxide is reduced directly by the carbonaceous material present in the vicinity thereof, and the iron oxide is further reduced with CO gas formed from the reaction between $CO_2$ formed upon reduction of the oxides gas and the carbonaceous material.

However, $CO_2$ gas formed upon reduction of the oxides and CO gas formed by reaction between the $CO_2$ gas and the carbonaceous material may often been discharged out of the pellets. Accordingly, it is preferred to incorporate the carbonaceous material into the pellets in an amount greater than a stoichimetrical amount of carbon required for reducing the iron oxides.

Furthermore, since the Zn ingredient in the pellets is often present in the state of oxide like that iron oxide, it is necessary to further incorporate a carbonaceous material into the pellets in order to reduce Zn oxide. Therefore, it is preferred to incorporate carbon into the pellets in an amount more than the theoretical amount of carbon required to reduce the iron oxide and Zn oxide. While the theoretical amount of carbon varies depending on the form of the reducing reaction of iron oxide and Zn oxide at the intended reduction temperature or the state of the oxides and it ranges from about 10 to 15 mass % based on the total amount of iron and Zn in the pellets. Further, when a combustion flame of a burner is used for the irradiation heating of the pellets, if $CO_2$ gas and steam ($H_2O$) evolved from the combustion are in contact with the pellet surface, reduced iron is oxidized again, so that it is necessary also for controlling the re-oxidation to incorporate the carbonaceous material such that the amount of carbon is more than the theoretical amount required for reducing the iron oxide (C/(Fe+Zn)). For this purpose, it is desirable to control the amount of carbon in the pellets to 13 mass % or more. However, when the more importance is attached to the Zn removing ratio and physical strength rather than the reduction ratio of products such as in a case of using pellets after reduction as the starting material for the blast furnace, the amount of the carbonaceous material to be blended can be decreased to 13% or less. This can provide a merit capable of decreasing the amount of the carbonaceous material and improving the productivity.

On the other hand, if the addition amount of the carbonaceous material incorporated in the pellets is increased, the shape retainability of the pellets is deteriorated to result in pulverization of the pellets during reduction. Since the pulverization of pellets lowers the efficiency of contact of iron oxide and Zn oxide with the carbonaceous material or CO gas, the reduction efficiency for the iron oxide and the reduction efficiency for Zn oxide are lowered. Furthermore, since the proceeding of the sintering for the pellets is inhibited making it difficult to retain the pellet shape, the original shape retainability of the pellets is deteriorated remarkably. Accordingly, by defining the amount of carbon in the pellets, preferably, to 60 mass % and, more preferably, to 45 mass % or less, the reduction ratio of the pellets can be further improved and the shape of the pellets can be retained more firmly.

It is necessary that the temperature elevation ratio to 3 to 13° C./sec within a temperature region of the pellets from 150 to 900° C. This is because the reduction of the pellets does not proceed so effectively, sintering for the iron ingredient particles less occurs and the strength of the pellets is not increased within a temperature region from 150 to 900° C. and, accordingly, it is necessary to rapidly pass this temperature region from 150 to 950° C. rapidly. The strength of the pellets can be increased by bringing the pellets into a temperature region of 900° C. or higher where the reduction ratio of iron oxide is high and reduced iron particles in the pellets are sintered more rapidly while setting the temperature elevation rate to 3° C./sec or higher. If the temperature elevation ratio exceeds 13° C./sec, the original shape retainability of the pellets is deteriorated. The pellets are preferably reduced at a temperature elevation rate of 5 to 10° C./sec. When the temperature elevation rate is set to 5° C./sec or higher, the strength of the reduced pellets can be further improved, and the shape can be retained more effectively. By increasing the temperature elevation rate, it is possible to rapidly reach a temperature region of 1100° C. or higher where Zn is removed preferentially and, as a result, Zn can be removed more efficiently with the carbonaceous material in the pellets. Particularly, when it is intended to remove Zn preferentially, this range for the temperature elevation rate is suitable. Further, the pellet productivity can also be improved by increasing the temperature elevation rate for the pellets.

The pellets are preferably reduced within a temperature range from 1100 to 1350° C. When the pellets are reduced at a temperature of 1100° C. or higher, since Zn oxide is reduced preferentially to the reduction of iron oxides, the amount of Zn in the pellets can be decreased significantly. Further, if the temperature for reduction of the pellets is at 1100° C. or higher, the reduction ratio is increased and the sintering for metal iron is proceeded to increase the strength of the reduced pellets. For example, the crush strength of the pellets reduced at 1100° C. is 70 kgf/P or more, and the value gives a sufficient strength of pellets as the starting material for the blast furnace. This is because a value of 40 kgf/P or more is necessary as the starting material for the blast furnace. The reduction temperature is preferably set to 1200° C. or higher. This is because Zn oxide can be reduced more preferentially and the strength of the reduced iron pellets can be increased further. Furthermore, the productivity can be improved while maintaining the quality of the reduced iron pellets (Zn removing ratio, strength and iron reduction ratio). On the other hand, if the pellets are reduced at a temperature higher than 1350° C., pellets tend to be fused to each other, so that the pellet reduction temperature is preferably set to 1350° C. or lower.

As the carbonaceous material incorporated into the pellets, coke ingredients are preferably used. Since coke scarcely has volatile ingredients, it does not evaporate the volatile ingredients at a temperature region in which reduction and sintering of the pellets less occur (150–900° C.). Since this does not increase the gas pressure accompanying the evaporation of the volatile ingredients and does not cause pulverization of the pellets, the temperature elevation rate of the pellets can be increased.

The sintering furnace has a furnace structure of interrupting the inside of the furnace from external air and preferably has a heating means for heating pellets fed in the furnace by heat conduction, mainly, radiation and a discharge means for discharging reaction gases containing the Zn ingredient reduced and evaporized from the pellets out of the furnace. As the heating means, radiation heat of burner combustion flames or radiation heat from radiant tubes can be used.

As the sintering furnace in the embodiment of the present invention, a rotary hearth furnace is preferably used. By the use of the rotary hearth furnace. Reduced pellets can be manufactured in a great amount and at a high efficiency. The structure of the rotary hearth furnace is to be explained with reference to FIG. 4.

Figure 4:
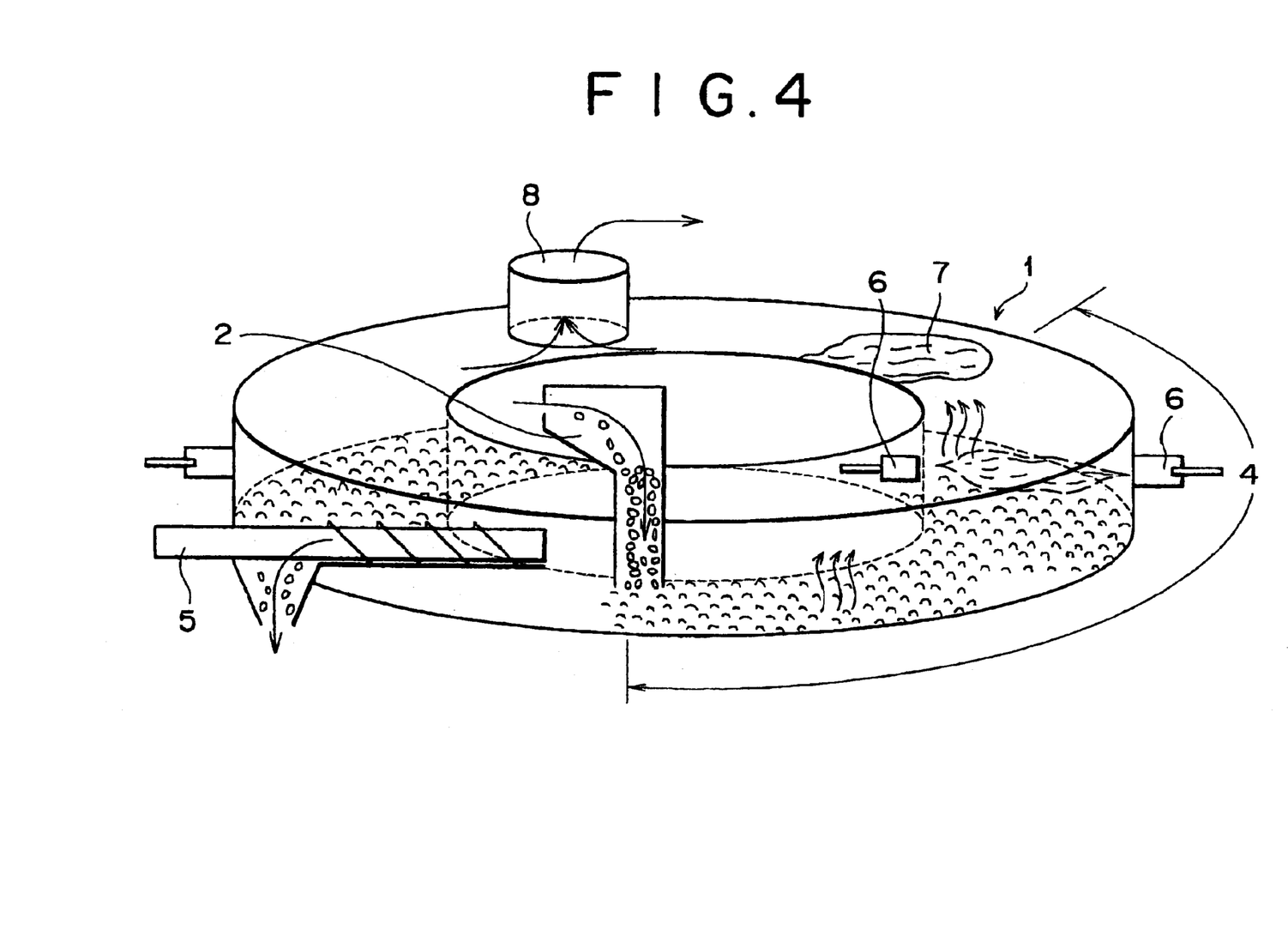
FIG. 4 is a conceptional view illustrating a structure of a rotary hearth furnace used in the present invention.

The rotary hearth furnace has a disc-shaped hearth, on which pellets are fed and moved along with the movement of the hearth, thereby producing reduced pellets continuously. Since the pellets are moved together with the hearth and the pellet themselves do not move, pulverization of pellets during reduction as occurred in a rotary kiln can be prevented. Further, the rotary hearth furnace has a furnace structure in which the inside of the furnace and the external air are interrupted. As an interrupting structure, heat resistant metal materials or refractories are used. Since the inside of the furnace is interrupted from the external air as described above, the atmosphere can be controlled easily.

As shown in FIG. 4, a rotary hearth furnace 1 comprises a pellet charging port 2, a reducing zone 4 and a reduced pellet discharge port 5. The pellets are heated by heat conduction of radiation from a burner 6 and a furnace wall. For heating the pellets, it is possible to use not only heating by the burner but also radiation heat generated by putting a CO gas resulting from the pellets to secondary combustion with air (shown at 7 in FIG. 4). As a result, it is possible to improve the heat conduction to the pellets and economize fuels for burner heating. The combustion gas is released from a gas discharge port 8 to the outside of the furnace. The combustion gas contains reaction gases containing Zn ingredients reduced and evaporated from the pellets, which form solid Zn oxide due to lowering of the temperature and can recover and treat Zn oxide by a dust collecting device.

Then, a method of producing reduced pellets in a rotary hearth furnace shown in FIG. 4 will be explained as a preferred embodiment of the present invention. Pellets prepared by a pelletizer are dried in order to improve the productivity of the rotary hearth furnace. The dried pellets are fed through the pellet charge port 2 to the rotary hearth furnace. In this case, the pellets are laid by one layer or laminated by two layers on the hearth. In this case, pellets are not fused to each other. It is considered that the pellets are merely laid by one layer or laminated by two layers in the furnace and suffer from no substantial effect of gravitational sintering caused by the lamination of the pellets to each other and that the pellets are not fused to each other since there is less points of contact between each of the pellets.

In the reduction zone 4, the temperature of the pellets is rapidly elevated by heat conduction of radiation through burner combustion and secondary combustion, in which iron oxide is reduced and Zn oxide is reduced and evaporated with the carbonaceous material incorporated in the pellets. In this case, since the amount of the carbonaceous material fed in the pellets is more than the theoretical amount of carbon required for the reduction of iron oxide and Zn oxide (within a range from about 10 to 15 mass %: although varying depending on the form of the compounds and the manner of reaction), when $CO_2$ and steam ($H_2O$) formed by burner combustion or secondary combustion reach the surface of the pellets, they are reduced to CO or $H_2$ with the carbonaceous material incorporated in excess to the pellets, so that iron oxide and Zn oxide can be reduced. Then, the reduced pellets are mechanically discharged from the pellet discharge port 5.

In the reduction zone 4, the pellets are heated so as to be kept within a temperature range from 1100 to 1350° C., and heat is supplied for the temperature elevation and endothermic reaction of the pellets in order to reduce iron oxide and Zn oxide in the pellets. In this case, since the pellets are laid by one layer or laminated by two layers in the furnace, heat conduction, mainly, radiation can be conducted efficiently.

EXAMPLE 1

Figure 1:
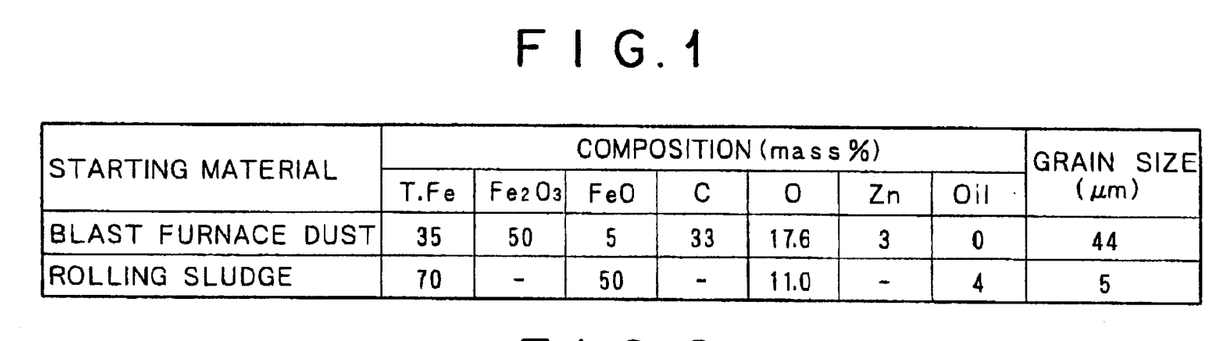
FIG. 1 is a table showing compositions for wet blast furnace dusts and rolling sludges in Example 4.
Figure 2:
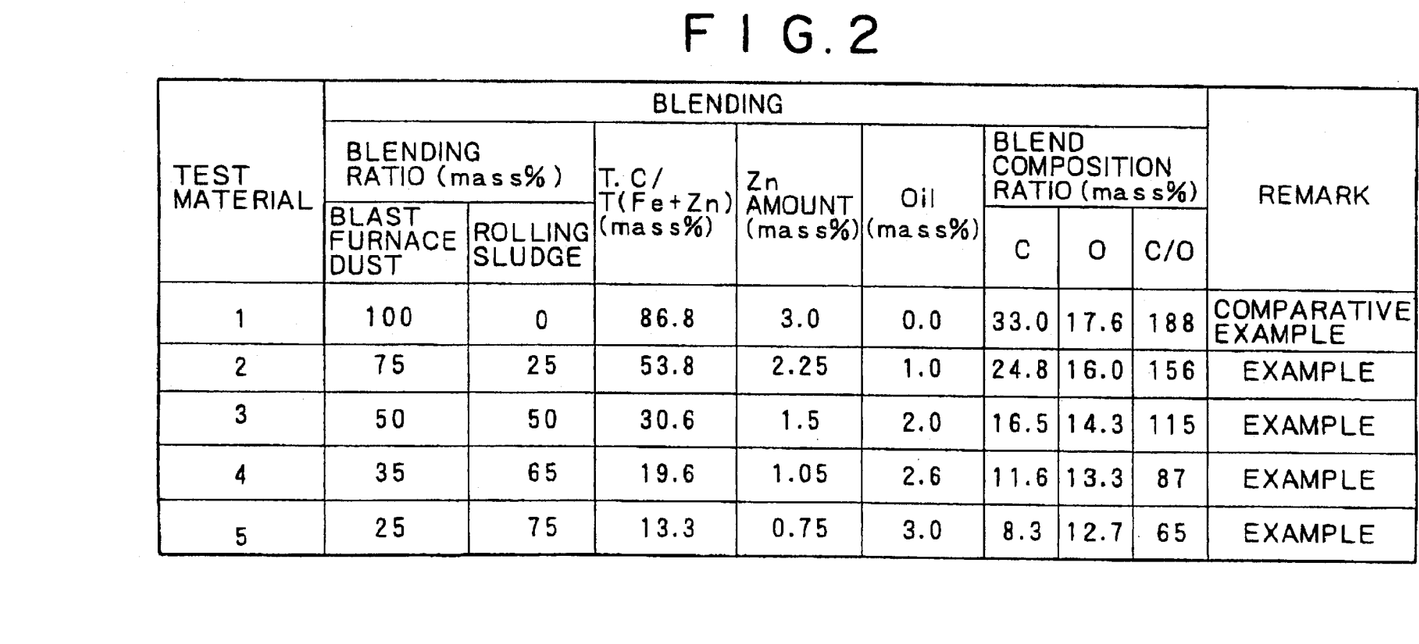
FIG. 2 is a table showing blending ratios of starting materials for sintering of wet blast furnace dusts and rolling sludges in Example 4.
Figure 3:
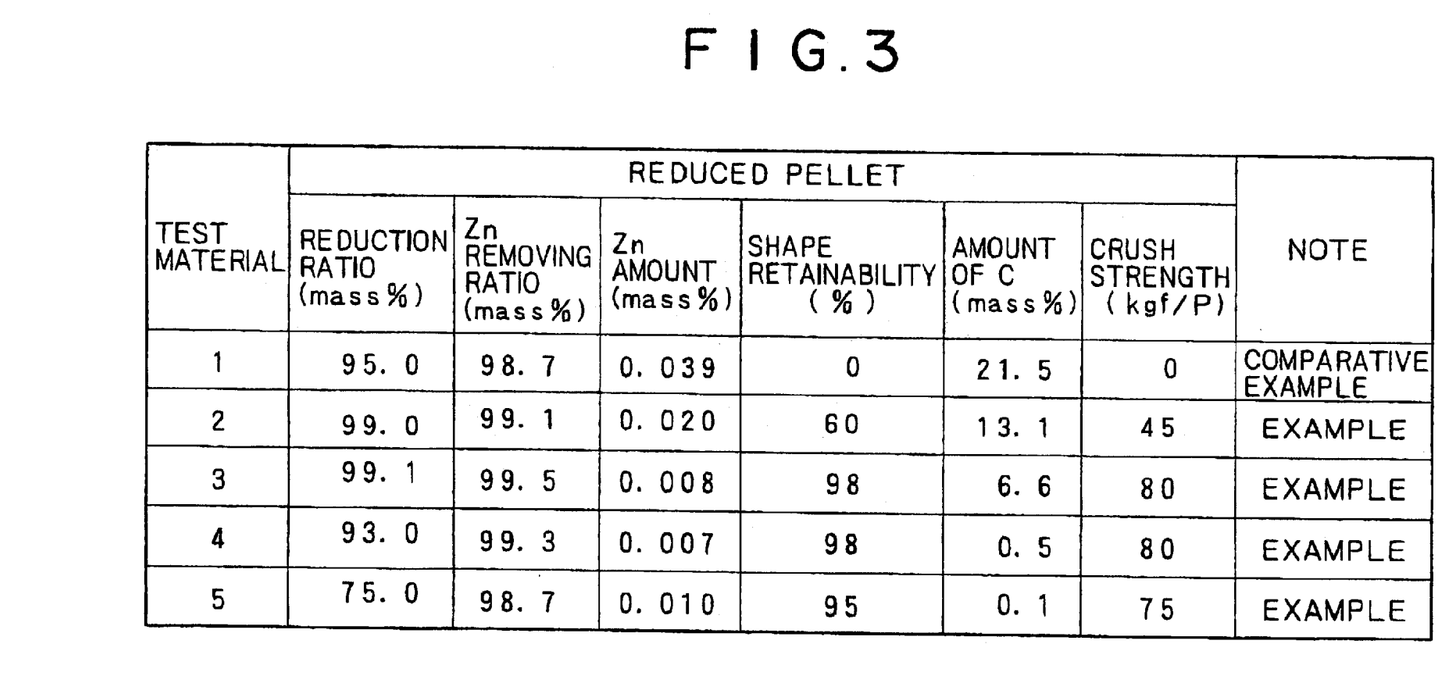
FIG. 3 is a table showing reduction ratio and Zn-removing ratio of reduced pellets produced in Example 4.

In the embodiment of the present invention, were used dry pellets incorporated with carbonaceous material, which were prepared by mixing a carbonaceous material (coke ingredient), wet blast furnace dusts comprising iron oxide containing Zn ingredients and other dusts comprising iron oxide (for example rolling sludges) in a predetermined blending ratio and putting them to molding and then drying steps. FIG. 1 is a table showing compositions for wet blast furnace dusts and rolling sludges used in this example, FIG. 2 is a table showing blending ratios for sintering materials of the wet blast furnace dusts and rolling sludges and FIG. 3 is a table showing reduction ratio, Zn removing ratio and the like of reduced pellets produced by this example.

As shown in FIG. 1, the wet blast furnace dusts used comprise iron oxide containing 33 mass % of carbon as the coke ingredient and 3 mass % of Zn ingredient as impurities. The iron component and the Zn ingredient in the blast furnace dusts are present substantially in the form of oxides. On the other hand, the rolling sludges contain 4 mass % of an oil component and, like that blast furnace dusts, the iron component in the rolling sludges is present substantially in the form of oxides. Such blast furnace dusts and rolling sludges were mixed in a blending ratios shown in FIG. 2, to which a binder and water were added and molded into green pellets with a diameter of about 16 to 20 mm. Then, the green pellets were dried at 160° C. by a gas mixture comprising a combustion gas and air till the water content was lowered to less than 1.0 mass %.

Figure 8:
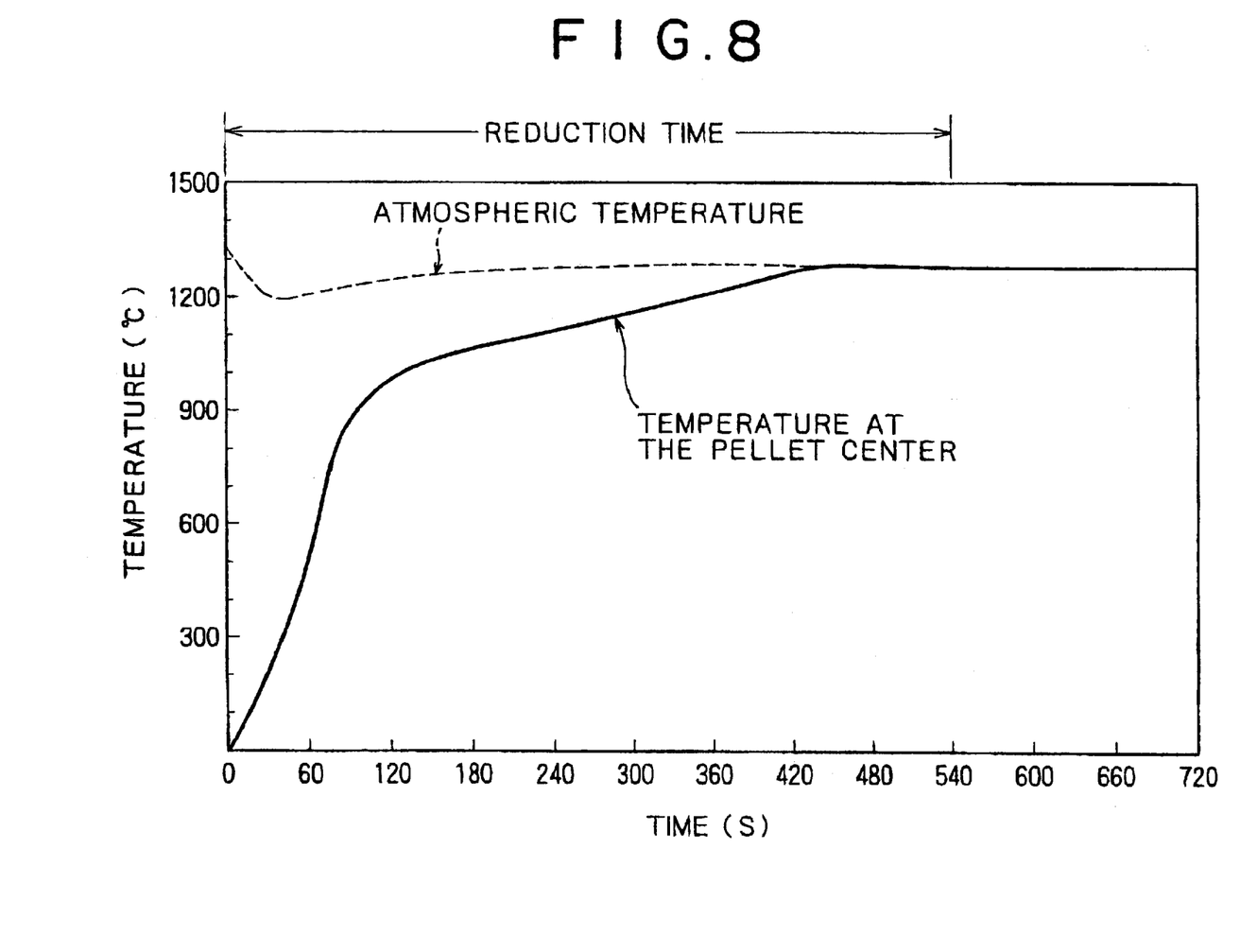
FIG. 8 is a view showing a temperature elevation curve of the pellets.

Then, the dry pellets were charged in an electric heating furnace maintained in an $N_2$ gas atmosphere at 1300° C. for 9 min. The temperature elevation curve of the pellets is shown in FIG. 8.

Figure 9:
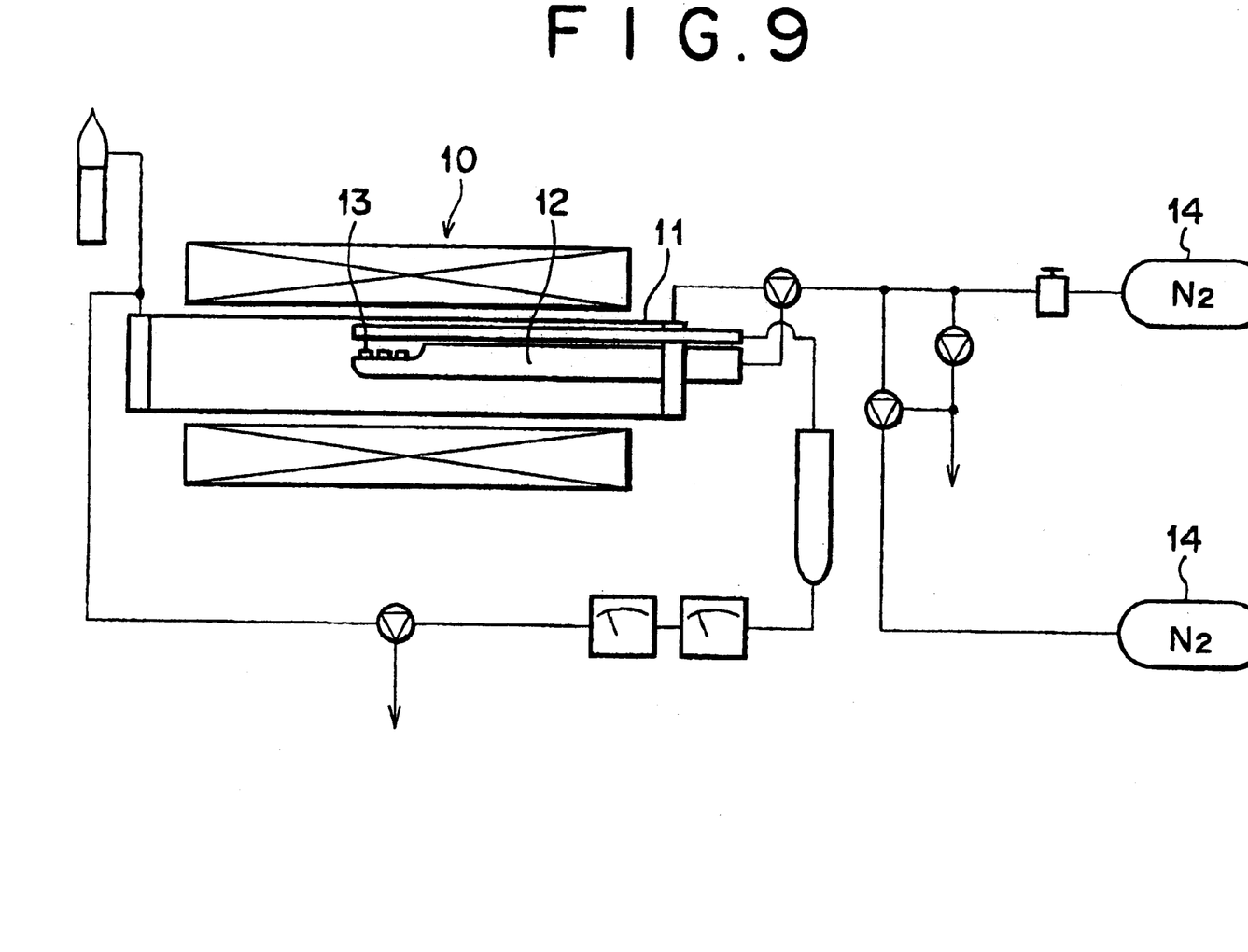
FIG. 9 is a conceptional view illustrating a structure of an electric heating furnace used in the example of the present invention.

The sintering furnace used in the experiment of the present invention is an electric heating furnace 10 shown in FIG. 9 in which the inside of the furnace is interrupted from external air by a pipe 11 made of a refractory material. The carbonaceous material incorporated pellets were set to a specimen holder 12 and charged into the electric heating furnace 10 previously maintained at a predetermined reduction temperature in an $N_2$ atmosphere. Thermocouples (not illustrated) were set to a central portion of the pellets in order to measure the temperature elevation rate of the pellets.

Figure 5:
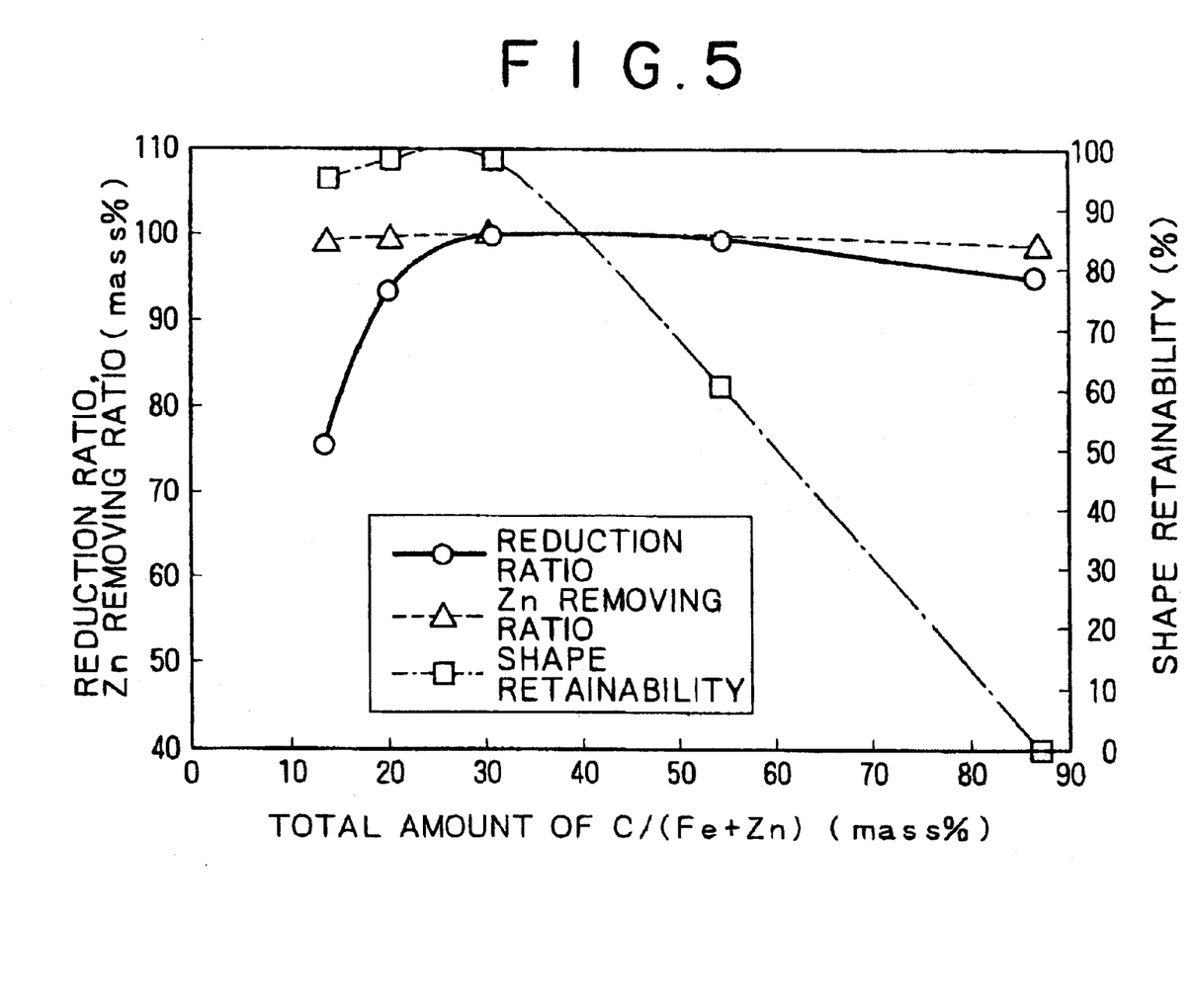
FIG. 5 is a view showing effects of the amount of carbon on the reduction ratio of the pellets, Zn removing ratio and original shape retainability of the pellets when they are heated in an inert atmosphere at 1300° C.

At first, the effect of the amount of carbon incorporated into the pellets is explained with reference to FIG. 5. In FIG. 5, the abscissa indicates the amount of carbon incorporated in the pellets based on the total amount of iron and Zn in the pellets, while the ordinate indicates the reduction ratio of the pellets (in solid line) and the shape retainability of the pellets (in dotted chain).

The reduction ratio of the pellets is a value obtained by dividing "amount of oxygen bonded with Fe removed by reduction" with "initial amount oxygen bonded with Fe".

Further, the original shape retainability defines the appearance of the reduced pellets as:

Original shape retainability=E (shape index×frequency) %

Namely, the original shape retainability is expressed by defining the shape index as:

100: pellets retaining the shape, with no substantial cracks being recognized

75: pellets retaining the shape, with cracks being recognized

50: pellets including large cracks at the inside or cracked into two pieces

25: pellets cracked into several blocks

0: pellets being pulverized and is expressed by multiplying the frequency exhibiting the above-mentioned appearance with the shape factor.

As shown in FIG. 5, it can be seen that if the amount of carbon in the pellets based on the total amount of iron and Zn is within a range from 13 to 60 mass %, the reduction ratio of the pellets is 75 mass % or more, and the shape retainability of the reduced pellets is 50% or more. In this case, the Zn removing ratio is 98 mass % and it can be seen that Zn can be reduced satisfactorily.

Usually, it is required that the reduction ratio of the reduced pellets is 75 mass % or more, and the original shape retainability of the reduced pellets has a limit for the shape retainability of 50% with a view point of the handlability upon charging them into a blast furnace and a converter.

Furthermore, it is considered that if the amount of carbon in the pellets is 18 mass % or more, the reduction ratio of the reduced pellets is 90 mass % or more, whereas if the amount of carbon in the pellets is less than 45 mass % or less, the original shape retainability of the reduced pellets is 75% or more. It has been confirmed that the strength of the reduced pellets in this case is within a range from 45 to 80 kgf/P and can be used as the starting material for the blast furnace.

EXAMPLE 2

Figure 6:
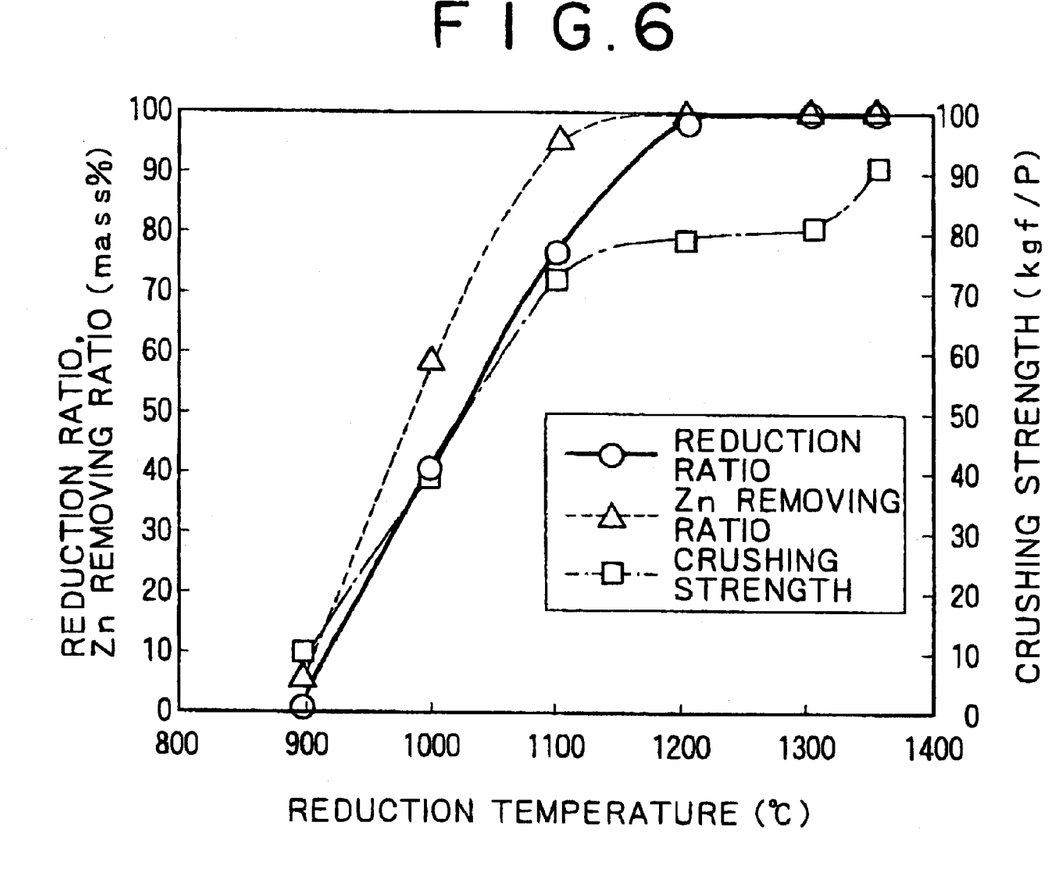
FIG. 6 is a view showing effects of reduction temperature on the reduction ratio of pellets, Zn-removing ratio and compression strength.

Example 2 is an example showing the effect of the reduction temperature of the pellets. The pellets were charged into the electric heating furnace kept at a temperature from 900 to 1350° C., maintained for 12 min after the pellets reached a predetermined temperature and then the pellet reduction was conducted. FIG. 6 shows the results of measuring the Zn amount, the reduction ratio and the crushing strength of the reduced pellets.

As shown in FIG. 6, the Zn removing ratio of the reduced pellets reached 99 mass % or more at 1200° C. or higher, and the Zn amount was reduced to 0.01 mass % or less. This is because Zn oxide is reduced preferentially to iron oxide in a high temperature region and it has been proved that the amount of Zn is lower by one digit and Zn can be removed more efficiently than in the prior art. On the other hand, it can be seen that the reduction ratio and the crushing strength of the reduced pellets are increased along with the elevation of the reduction temperature. They have a sufficient strength of the reduced pellets as the starting material for the blast furnace at 1100° C. or higher. In this case, although fusion was partially recognized between each of the pellets at 1350° C., fusion was not recognized at other temperatures. Further, partially fused portions between each of the pellets at 1350° C. can also be pulverized mechanically.

EXAMPLE 3

Example 3 is an example showing the effect of the temperature elevation rate of the pellets.

Figure 7:
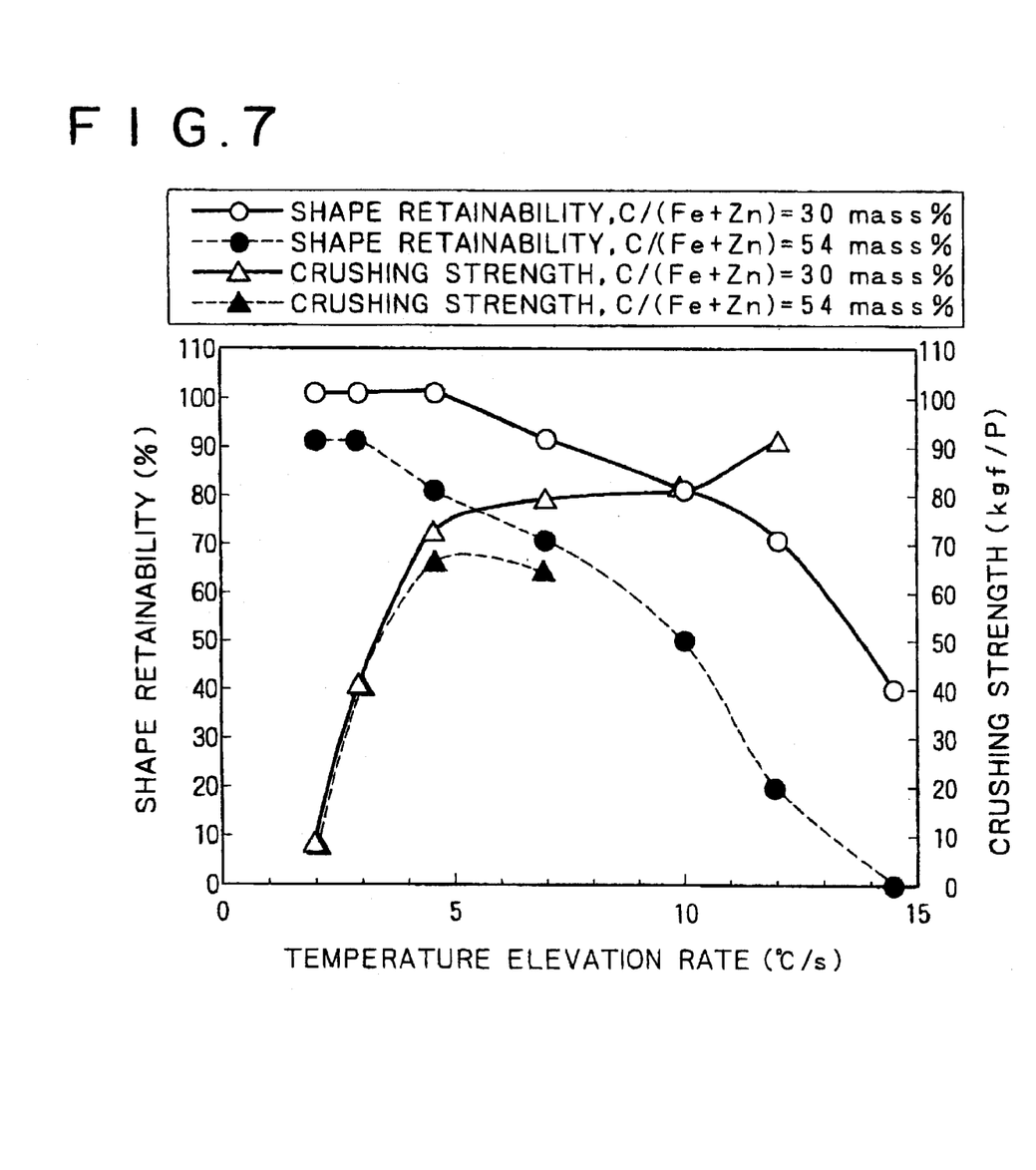
FIG. 7 is a view showing effects of the temperature elevational rate of pellets on the original shape retainability and the crushing strength of the reduced pellets in a case of heating the pellets at 1300° C. in an inert atmosphere.

For the pellets having the amount of carbon incorporated in the pellets of 30.6 mass % and 53.8 mass %, respectively, based on the total amount of iron and Zn in the pellets, temperature elevation experiment was conducted while varying the temperature elevation rate within a temperature range from 150 to 900° C. and the results are shown in FIG. 7.

As shown in FIG. 7, it has been found for the amount of carbon of 30.6 mass % in the pellets based on the total amount of iron and Zn, that the original shape retainability of the pellets can be maintained to 50% at the temperature elevation rate of the pellets of 13° C./sec or less, and the original shape retainability of the pellets can be improved and shape retainability of the pellets is about 100% at the temperature elevation rate of the pellets of 5° C./sec or less. In the same manner, it has been proved also for the amount of carbon of 53.8 mass % that the original shape retainability of the pellets is improved along with the decrease of the temperature elevation rate of the pellets, and the original shape retainability of the pellets can be maintained to 50% or higher by keeping the temperature elevation rate of the pellets to 10° C./sec or lower. On the other hand, along with the proceeding of reduction, the crushing strength of 40 kgf/P is obtainable due to the sintering of the metallic iron at the temperature elevation rate of 3° C./sec or higher and the sintering becomes complete to obtain reduced pellets having a sufficient strength at a temperature elevation rate of 5° C./sec or higher. Accordingly, it can be seen that a temperature elevation rate of 3 to 13° C./sec, preferably, 5 to 10° C./sec is necessary in order to obtain reduced pellets with high original shape retainability and high strength.

EXAMPLE 4

Example 4 is an example showing the reduction ratio and the Zn removing ratio of reduced pellets produced under the conditions of Example 1. As shown in FIG. 3, it has been confirmed in any of examples of the present invention that the amount of Zn was reduced to 0.020 mass % or less and Zn can be reduced satisfactorily.

In the example of the present invention, it can be seen that the original shape retainability of the pellets is kept at 50% or more, the crushing strength of the resultant reduced pellets is 45 kgf/P or more and the reduction ratio is also 75 mass % or higher, which can be used as the starting material for the blast furnace. Particularly, in a test material 3 comprising blast furnace dusts and rolling sludges each at 50 mass % blending ratio (amount of carbon in pellets based on iron+Zn component ratio), it can be seen that resultant pellets have a reduction ratio of 99.1% and an original shape retainability of 98%, so that the reduction ratio and the original shape retainability of the pellets can be removed remarkably.

In this example, the oil component was contained by 2 mass % in the initially molded green pellets but, if the oil content in the green pellet is about 2 mass %, breakage of pellets during reduction was not recognized.

The method of the present invention can provide reduced pellets at high reduction degree (reduction ratio at 75 mass % or more) and with extremely small amount of Zn as the starting material not only for the blast furnace but also for the converter and the electric furnace.

The method of the present invention is not restricted only to this embodiment, and the method can use not only the blast furnace dusts containing the carbonaceous material and rolling sludges but also other iron oxide-containing dusts or sludges resulting from iron and steel making processes as the starting material for the pellets. Furthermore, the grain size of the pellets is not restricted only to about 16–20 mm as shown in this example, but it may be about 6 to 16 mm which is a general particle size of sintered iron oxide pellets used for the blast furnace. Furthermore, the method of the present invention can be used not only to the reduced pellets but also to the manufacture of reduced briquettes. Dry briquettes are used for the manufacture of the reduced briquettes and dry briquettes are obtained by a method, for example, of adding water to raw materials containing additives into briquettes and then drying them like in the case of the green pellets, and a method of briquetting by adding additives to previously dried raw materials.

Furthermore, in this embodiment, the pellets were reduced in the electric heating furnace shown in FIG. 9, and the results can be applied to a rotary hearth furnace. When pellets are reduced in the rotary hearth furnace, reduced pellets with extremely low Zn content, having appropriate grain size and strength and with high reduction ratio can be produced in a great amount and at a high efficiency.

In this embodiment, an inert gas typically represent by $N_2$ gas (also including Ar gas) was used as the atmosphere, but an atmosphere such as a combustion gas by burner heating as in a rotary hearth furnace may also be used. Since the combustion gas can be used as a carrier gas for the reaction gas containing the Zn ingredients reduced and evaporated from the pellets, there is no requirement for additionally supplying an $N_2$ gas or the like as the carrier gas, which can not only save $N_2$ gas or the like but also avoid heat loss caused by $N_2$ gas supplied separately.

EXAMPLE 5

Figure 10:
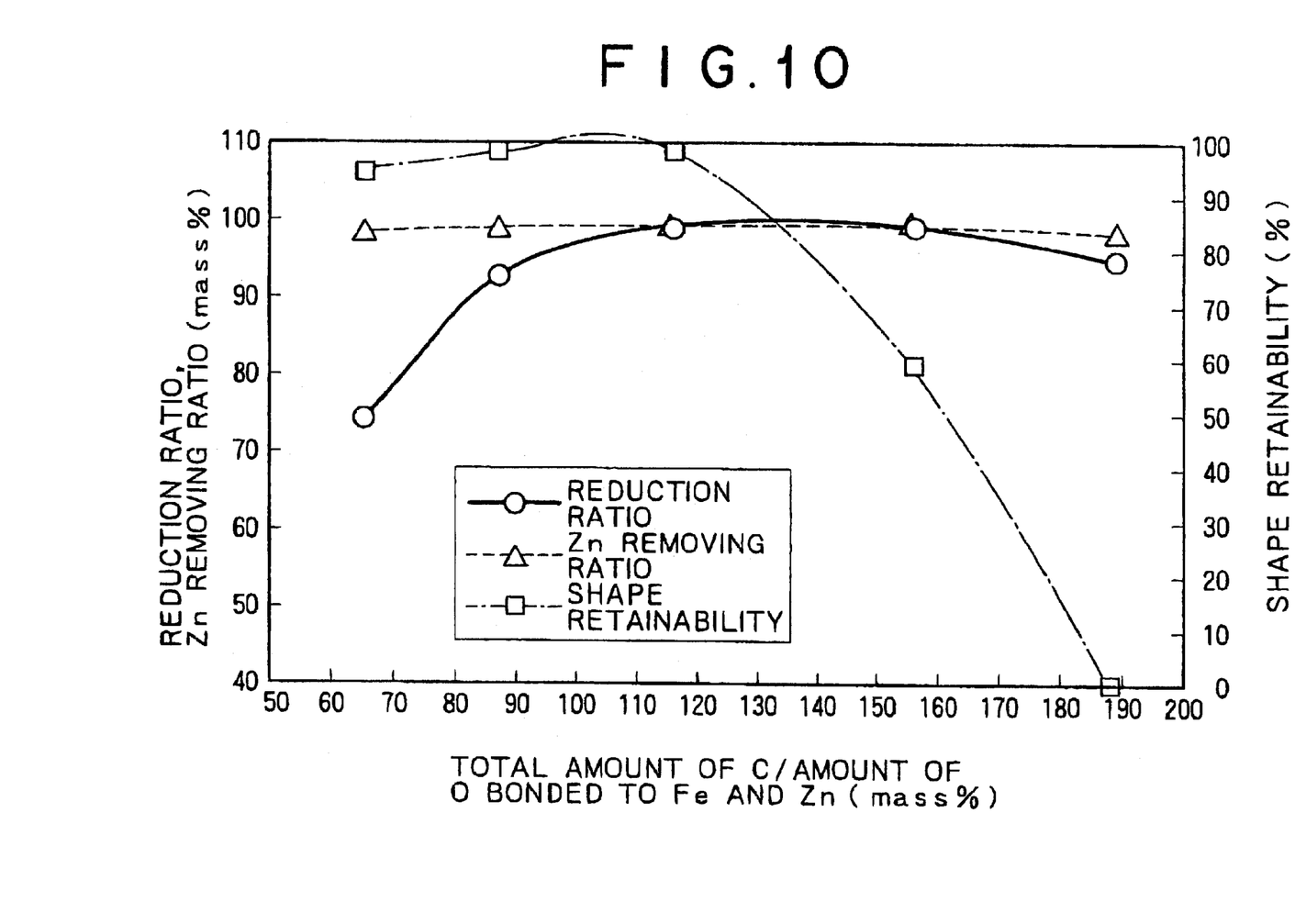
FIG. 10 is a graph showing a relationship between the ratio (C/O) for the amount of oxygen bonded with Fe and Zn in the pellets, and the reduction ratio of the reduced pellets, the Zn removing ratio and the original shape retaining ratio.

Further, since the sludges or dusts as the starting material for the pellets comprise, as the main ingredient, oxides of iron and Zn, and composite compounds of iron and Zn, the method of the present invention can also cope with a case in which a small amount of metallic iron, metallic Zn and composite compounds of iron and Zn are present. In such a case, the amount of carbon in the pellets may be within a preferred range of 13 to 60 mass % based on the total amount of iron and Zn. This can be mentioned, in another expression, as that the ratio of the amount of the carbon blended in the pellets and the amount of oxygen bonded with Fe and Zn in the pellets (C/O) is within a range from 65 to 160 mass %. In view of FIG. 10 showing a relationship between the ratio of the amount of oxygen bonded with Fe and Zn in the pellets (C/O), and the reduction ratio, Zn removing ratio and the original shape retainability, it can be seen that the reduced pellets at high reduction ratio, with the original shape retainability of 50% or more and with extremely low Zn content can be obtained within this range.

The entire disclosure of Japanese Patent Application No. 9-349473 filed on Dec. 18, 1997 including specification, claims, drawings and summary are incorporated herein by reference in its entirety.

We claim:

1. A method of producing reduced iron pellets, comprising the following steps:

1) preparing green pellets from a feed material mixture comprising one or more dusts containing iron oxide and zinc oxide, a binder in an amount sufficient to bond the dusts, and water, wherein said green pellets incorporate carbonaceous material from said one or more dusts and/or added separately, and wherein said green pellets contain an amount of carbon in a concentration of from 7 to 60 mass% based on the total amount of iron and zinc;

2) drying the thus prepared green pellets to prepare dry pellets;

3) feeding the dry pellets to a furnace;

4) heating the dry pellets at a temperature elevation rate of from 3 to 13° C./sec within a temperature range from 150 to 900° C. of the pellets; and 5) further heating said pellets to temperatures sufficient to reduce said zinc oxide to zinc and evaporate said zinc, and to reduce said iron oxide.

2. A method as defined in claim 1, wherein the amount of the carbon is from 13 to 60 mass % based on the total amount of iron and Zn.

3. A method as defined in claim 1, wherein the amount of the carbon is from 13 to 45 mass % based on the total amount of iron and Zn.

4. A method as defined in claim 1, wherein the temperature elevation rate is from 5 to 10° C./sec.

5. A method as defined in claim 1, wherein reduction of the iron oxide and Zn oxide is conducted at a temperature from 1100 to 1350° C.

6. A method as defined in claim 1, wherein reduction of iron oxide and Zn oxide is conducted at a temperature from 1200 to 1350° C.

7. A method as defined in claim 1, wherein the dusts are blast furnace dusts containing a carbonaceous material, converter dusts, sintering dusts, electric furnace dusts or mixtures thereof.

8. A method as defined in claim 1, wherein the carbonaceous material comprises a coke ingredient.

9. A method as defined in claim 1, wherein a rotary hearth furnace is used as the furnace.

10. The method as defined in claim 1, wherein step 4) is carried out mainly by radiation.

* * * * *